United States Patent
Hirakawa et al.

(10) Patent No.: US 8,240,675 B2
(45) Date of Patent: Aug. 14, 2012

(54) SEAL STRUCTURE (75) Inventors: Yuichi Hirakawa, Takasago (JP);
Hidekazu Uehara, Takasago (JP);
Takashi Nakano, Tokyo (JP); Shin Nishimoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 316 days.

(21) Appl. No.: 12/667,568

(22) PCT Filed: Jan. 15, 2009

(86) PCT No.: PCT/JP2009/050439
§ 371 (c)(1),
(2), (4) Date: Jan. 21, 2010

(87) PCT Pub. No.: WO2009/093512
PCT Pub. Date: Jul. 30, 2009

(65) Prior Publication Data
US 2010/0164179 A1 Jul. 1, 2010

(30) Foreign Application Priority Data
Jan. 25, 2008 (JP) .................................. 2008-014865

(51) Int. Cl.
*F16J 15/447* (2006.01)

(52) U.S. Cl. .......................... 277/412; 277/414; 277/415
(58) Field of Classification Search .................. 277/412, 277/414, 415
See application file for complete search history.

(56) References Cited

U.S. PATENT DOCUMENTS

| | | | | |
|---|---|---|---|---|
| 3,339,933 A | * | 9/1967 | Foster | 277/415 |
| 3,880,550 A | * | 4/1975 | Corey et al. | 415/173.4 |
| 4,060,250 A | * | 11/1977 | Davis et al. | 277/415 |
| 4,257,735 A | * | 3/1981 | Bradley et al. | 277/303 |
| 4,536,127 A | * | 8/1985 | Rossmann et al. | 415/173.4 |
| 6,962,482 B2 | * | 11/2005 | Tanaka | 415/173.1 |
| 2002/0192074 A1 | | 12/2002 | Turnquist et al. | |
| 2003/0107181 A1 | | 6/2003 | Wieghardt | |
| 2003/0228483 A1 | | 12/2003 | Fiala et al. | |
| 2004/0126225 A1 | | 7/2004 | Ghasripoor et al. | |
| 2005/0063827 A1 | | 3/2005 | Ochiai et al. | |

(Continued)

FOREIGN PATENT DOCUMENTS
JP 2-298604 12/1990
(Continued)

OTHER PUBLICATIONS

International Search Report issued Feb. 24, 2009 in International (PCT) Application No. PCT/JP2009/050439.

*Primary Examiner* — Vishal Patel
(74) *Attorney, Agent, or Firm* — Wenderoth, Lind & Ponack, L.L.P.

(57) ABSTRACT

A seal structure includes a thick abradable film, thereby improving sealing performance. A seal structure (1) is provided with at least one fin (5) that projects in a ring-shape from a circumferential surface of a rotating shaft (3) and that is provided along an axial direction (L) and a seal member (9) having a ring-shaped sealing surface (19) opposed to the fin (5), and on which an abradable layer (25) is formed by thermally spraying abradable material onto the sealing surface (19), the seal structure (1) is provided with tapered portions (21) inclined in a radial direction (K) at end portions of the sealing surface (19) in the axial direction (L).

7 Claims, 4 Drawing Sheets

U.S. PATENT DOCUMENTS

2006/0249911 A1 11/2006 Kowalczyk et al.
2007/0147990 A1 6/2007 Kamimura et al.

FOREIGN PATENT DOCUMENTS

| | | |
|---|---|---|
| JP | 2002-228013 | 8/2002 |
| JP | 2003-65076 | 3/2003 |
| JP | 2003-532014 | 10/2003 |
| JP | 2004-211896 | 7/2004 |
| JP | 2005-529238 | 9/2005 |
| JP | 2006-312937 | 11/2006 |
| JP | 2007-170302 | 7/2007 |
| WO | 2004/033755 | 4/2004 |

* cited by examiner

SEAL STRUCTURE

TECHNICAL FIELD

The present invention relates to a seal structure that is used for a rotating shaft part of a rotary machine.

BACKGROUND ART

As a seal structure of a rotating shaft part in a rotary machine, such as a steam turbine, a gas turbine, a compressor, etc., a so-called labyrinth seal structure, such as those mentioned in, for example, Patent Citation 1 and Patent Citation 2, is widely used.

The labyrinth seal structure is formed of a plurality of fins that project in a ring-shape and that are provided along the axial direction on a rotating shaft or a stationary part opposed thereto and a surface opposed to these fins (opposing surface). Even though the fins are machined to have sharp tips of about 0.2 mm in order to reduce the influence of contact with the opposing surface, since it essentially involves contact between metals, the amount of heat generated by the sliding is great, and a shaft vibration may be caused during heavy contact; therefore, the clearance between the fins and the opposing surface cannot easily be narrowed.

Since the sealing performance, in other words, the performance of a rotary machine, is determined by the number of fins and the clearance between the fins and the opposing surface, it is necessary to narrow the clearance between the fins and the opposing surface in order to improve the performance of the rotary machine. For example, in Patent Citation 1, there is disclosed a structure that employs an Active Clearance Control (ACC) seal, and the clearance is changed by utilizing the differential pressure between a transition period at start-up time and during rated operation. Furthermore, in Patent Citation 2, reduction of the heat generated during contact is attempted by applying an abradable portion, which can be abraded easily, on a contact surface of an opposing surface of a stationary part facing the fins.

A rotary machine is generally designed such that a rotating shaft rotates quietly and constantly in the rated rotational speed range, and there is a speed range (hereinafter this is referred to as a critical speed range) where, soon after start-up, the vibration level of the rotating shaft becomes the maximum while the rotational speed is increasing. The rotating shaft reaches the rated rotational speed range via this critical speed range. Furthermore, stationary parts may deform non-uniformly because of a temperature difference at start-up time, and thereby, the clearance may transitionally become the minimum due to differential thermal expansion in the vertical direction. In this way, if the fins and the opposing surface come into heavy contact when the clearance is the minimum at start-up time, there is a possibility that a vicious circle is repeated whereby the rotating shaft side is locally heated by the excessive heat generated by the sliding, causing bending of the shaft, which then causes even more heavy contact. In this regard, by applying the abradable material, the amount of heat generated by the sliding itself becomes small, and it is possible to achieve a design capable of allowing contact up to a certain degree.

Patent Citation 1: Japanese Unexamined Patent Application, Publication No. 2002-228013
Patent Citation 2: Japanese Unexamined Patent Application, Publication No. 2003-65076

DISCLOSURE OF INVENTION

As described above, by applying an abradable material, the advantages in terms of a clearance design are great, and there are various known materials which can be used as the abradable material. Regarding a ring-shaped member, such as a turbine member, on which a uniform film thickness is required, for example, a coating (a film) of the abradable material obtained by inner diameter thermal spraying is believed to be effective. With the thermal spraying processing, since semi-solid particles being thermally sprayed shrink upon solidification after adhering to a base material (the opposing surface of the fins), residual stress is developed thereby. The thicker the film becomes, the greater the residual stress will be. As this residual stress is increased, the film will separate at the interface between the base material and the film (interfacial separation will occur). This becomes prominent particularly when the abradable material is applied to a curved surface, such as the ring member of a turbine. Furthermore, the effect tends to be greater at the edges of the film.

In practice, therefore, it is difficult to form a film having a sufficient thickness. Thus, with significant concern for safety, the clearance in the rated rotational speed range has to be widened, and the sealing performance has to be limited under the current situation.

In light of the problems described above, the present invention provides a seal structure with which a thick abradable film is obtained and the sealing performance can be improved thereby.

In order to solve the aforementioned problems, the present invention employs the following solutions.

A first aspect of the present invention is a seal structure provided with at least one fin that projects in a ring-shape from a circumferential surface of a rotating member and that is provided along an axial direction, and a seal member having a ring-shaped sealing surface opposed to the fin, and on which an abradable film is formed by thermally spraying abradable material onto the sealing surface, the seal structure including an inclined portion inclined in a radial direction at an end portion of the sealing surface in the axial direction.

According to this aspect, since the end portions of sealing surface in the axial direction are provided with the inclined portions inclined in the radial direction, the abradable film on the inclined portions is formed so as to follow the shape of the inclined portions, that is to say, formed in a shape that is inclined in the radial direction.

Therefore, since the abradable films formed on the inclined portions are laminated in different direction from that of the abradable film formed on the central portion in the axial direction, the abradable film becomes a morphological structure, in which the lamination direction is changed at the inclined portions.

When the lamination direction of the abradable film is changed, the directions of action of the residual stresses become mutually different, and therefore, the effect thereof can be segmented.

In this way, since the influence of the central portion in the axial direction can be separated, interfacial separation in the inclined portions that are the end portions particularly prone to separation can be effectively inhibited. Therefore, the occurrence of interfacial separation can be inhibited even when there is large residual stress, and thus, the film thickness of the abradable film can be made larger.

If the film thickness of the abradable film can be made larger, then, for example, the clearance between the fins and the sealing surface (in other words, abradable film surface) in the rated rotational speed range can be set small, and therefore, the sealing performance of the seal structure can be improved.

Accordingly, for example, improved reliability and improved performance of the rotary machine can be achieved.

In this case, it is preferred to provide the inclined portions in the region where there will be no influence on the sealing action, and to make the film thickness of that abradable film small.

By doing so, the residual stress in the inclined portions can be reduced even more, and therefore, the film thickness of the abradable film in the central portion in the axial direction that achieves the sealing action can be made even larger.

The inclined portions may be formed, for example, by chamfering the end portions or may be formed by forming bank-shaped ridged portions towards the fins. Furthermore, they may be formed into either planar surfaces or curved surfaces.

In the above aspect, recesses and ridges are preferably formed along the axial direction at the central portion in the axial direction of the sealing surface.

By doing so, since the lamination direction of the abradable film changes in the central portion in the axial direction, the effect of the residual stress can be segmented.

Therefore, the residual stress acting on the abradable film in the central portion in the axial direction can be reduced, and thus, the film thickness of the abradable film can be made even larger.

This is particularly effective when, for example, the length in the axial direction of the central portion in the axial direction is long.

When the recesses and ridges in the central portion in the axial direction are perpendicular to the axial direction, the side wall portions of the recesses and ridges become parallel to the thermal spraying direction, which is a cause of weakening the adhesion of the film, and therefore, the side wall portions of the recesses and ridges are preferably inclined suitably in the radial direction so as to have a suitable angle relative to the thermal spraying direction.

In the above aspect, at the end surfaces of the seal member in the axial direction, it is preferable to form the abradable film by applying masking so as to have a gap with respect to the sealing surface.

By doing so, the masking will not be engaged with the interface between the sealing surface and the abradable film, and therefore, the occurrence of micro-cracks due to the masking at this interface can be prevented.

If these micro-cracks do not exist, there will be nothing that acts as a source of separation, and therefore, the occurrence of separation can be further inhibited. Accordingly, the film thickness of the abradable film can be made even larger.

In the above aspect, the seal member may consist of divided seal members that have been divided in the circumferential direction.

By doing so, the seal member can be produced by assembling the divided seal members after the divided seal members are produced, and therefore, for example, expansion of the production facilities can be inhibited even for a large seal member.

In the above aspect, the end portions of the divided seal member in the circumferential direction are preferably formed by, after the abradable film is excessively banked, cutting the excess convexity away by machining from the abradable film side towards the sealing surface side.

If the desirable film thickness of the abradable film is to be maintained to the end portions of the divided seal member in the circumferential direction, it is necessary to bank the abradable film over the end portion in the circumferential direction to some extent; in other words, it is necessary to conduct excessive banking.

This excess convexity that is banked excessively hinders the assembly and is cut away by machining. In this case, the excess convexity is cut away by machining from the abradable film side to the sealing surface side, and therefore, a force is not applied to the abradable film in the direction away from the sealing surface.

In this way, a force is not applied in the direction in which the abradable film is separated during machining, and therefore, separation (fracture) of the abradable film due to machining can be inhibited. Accordingly, the thickness of the abradable film can be made thick without being restricted by the machining.

Machining such as, for example, grinding, turning, etc. is used.

Furthermore, in the above aspect, the abradable material preferably contains resin material.

In this way, since the resin material is contained in the abradable material, it is possible to remove the resin material part by conducting heat treatment after the abradable film is formed by thermal spraying.

By doing so, the abradable film becomes a porous structure, and therefore, the amount of heat generated by sliding upon contact of the abradable film and the fins can be reduced.

By adjusting the content of the resin material, the hardness and porosity of the abradable film can be adjusted. When the resin material portion is removed, the contact surface area between the abradable film and the sealing surface is reduced, reducing the adhesive force between the two, and it is possible that separation may be caused; therefore, the resin material content must be in a range within which such a situation will not occur. Furthermore, in order to compensate for the lowering of the adhesive force, an undercoat for improving adhesion between the abradable film and the sealing surface may be applied on the sealing surface.

According to the present invention, since the end portions of sealing surface in the axial direction are provided with the inclined portions inclined in the radial direction, the abradable film can be made thick, for example, 3 mm or more, without separation.

Therefore, the clearance between the fins and the sealing surface (in other words, abradable film surface) in the rated rotational speed range can be set small, and therefore, the sealing performance can be improved.

Accordingly, for example, an improvement of the reliability and an improvement of the performance of the rotary machine can be achieved.

EXPLANATION OF REFERENCE CHARACTERS 1 seal structure
3 rotating shaft
5 fins
9 seal ring
11 end surface
19 sealing surface
21 tapered portion
23 ridged portion
24 ridged portion inclined portion
25 abradable layer
27 divided seal member
29 circumferential end surface
31 raised portion
33 masking
35 excess convexity
C circumferential direction
K radial direction
L axial direction

DETAILED DESCRIPTION OF THE INVENTION

In the following, a seal structure 1 used in a rotating shaft part of a rotary machine, such as a steam turbine, a gas turbine, a compressor, etc., according to an embodiment of the present invention will be described below with reference to FIGS. 1 to 7.

Figure 1:
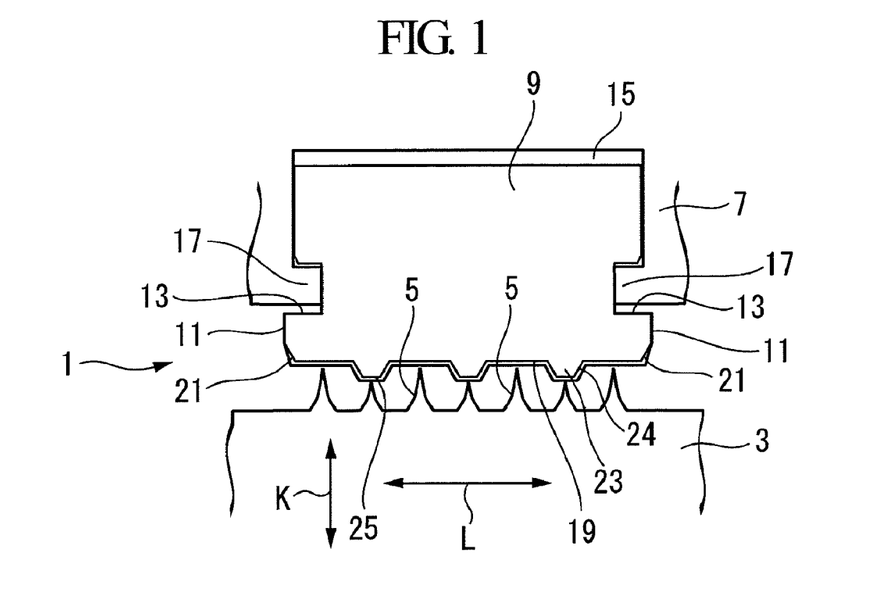
FIG. 1 is a longitudinal sectional view of a seal structure according to an embodiment of the present invention.

FIG. 1 is a longitudinal sectional view of a seal structure 1 according to this embodiment.

The seal structure 1 is provided with a plurality of fins 5 projected in a ring-shape from a circumferential surface of a rotating shaft (rotating member) 3 and a doughnut-shaped seal member 9 that is, for example, held on a stationary part 7, such as a housing etc., so as to cover the outer circumferential side of the fins 5.

The plurality of fins 5 are arranged with gaps therebetween along the axial direction L. The fins 5 are integrally formed with the rotating shaft 3 by milling.

The fins 5 may be separately formed from the rotating shaft 3 and then fixed on the rotating shaft 3 by means such as embedding etc.

The cross section along the axial direction L of the seal member 9 has an approximately rectangular shape. Engaging grooves 13 extending over substantially the entire circumference are provided in the end surfaces 11 at both sides of the seal member 9 in the axial direction L.

At the inner surface of the stationary part 7, a circumferential groove 15 is provided so as to extend over substantially the entire circumference. At the inner circumferential end portions of the circumferential groove 15, projecting portions 17 projecting inwardly of the circumferential groove 15 are provided so as to extend over substantially the entire circumference.

The seal member 9 is held in the stationary part 7 by being engaged with the circumferential groove 15 such that the engaging grooves 13 are engaged with the projecting portions 17.

The seal member 9 may be adjustable in position in the radial direction K.

A sealing surface 19 that is a surface on the inner circumferential side of the seal member 9 is located so as to oppose the fins 5.

At the end portions of the seal member 9 in the axial direction L, tapered portions (inclined portions) 21 each of which is strongly chamfered are provided. The positions, in the radial direction K, of the end portions of the tapered portions 21 in the axial direction L are set so as to be positioned towards the outer circumferential side in relation to that of the central side. That is to say, the tapered portion 21 is inclined in the radial direction K.

At the central portion of the seal member 9 in the axial direction L, a plurality of, for example three, ridged portions 23 that extend over substantially the entire circumference and project towards the inner circumferential side are provided with gaps therebetween in the axial direction L.

Therefore, the sealing surface 19 is formed to have recesses and ridges along the axial direction L.

On the sealing surface 19, an abradable layer (abradable film) 25, formed by thermal spraying abradable material, is formed with a substantially uniform film thickness T1 over substantially the entire surface.

At the side wall portions of the ridged portions 23, ridged portion inclined portions 24 suitably inclined relative to the radial direction so as to have a suitable angle relative to the thermal spraying direction are provided.

Because the abradable layer 25 is formed so as to follow the sealing surface 19, the abradable layer 25 is formed discontinuously along the axial direction L.

In other words, the abradable layer 25 is inclined in the radial direction K at the tapered portions 21 and is formed in a recessed/ridged shape by the ridged portions 23 in the central portion in the axial direction L.

Figure 3:
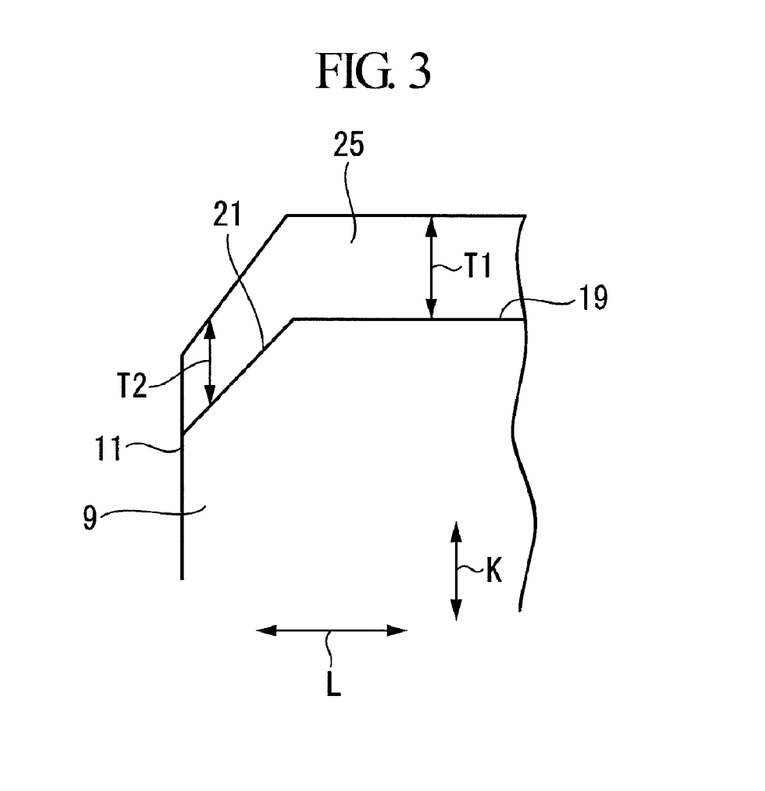
FIG. 3 is a partial sectional view showing a state of abradable layer formation in the vicinity of tapered portions according to an embodiment of the present invention.

Furthermore, as shown in FIG. 3, the film thickness T2 of the abradable layer 25 on the tapered portions 21 is made thinner than the film thickness T1 at the other portions.

Figure 4:
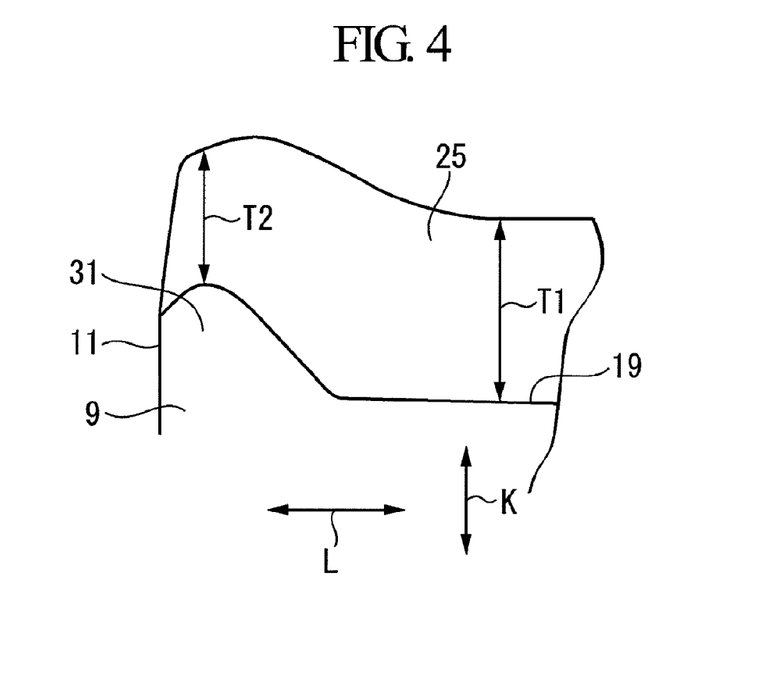
FIG. 4 is a partial sectional view showing a state of abradable layer formation in the vicinity of raised portions according to an embodiment of the present invention.

At the end portions of the seal member 9 in the axial direction L, as shown in FIG. 4, bank-shaped raised portions (inclined portions) 31 may be provided instead of the tapered portions 21.

Also in this case, the abradable layer 25 is formed discontinuously along the axial direction L at the raised portions 31.

The film thickness T2 of the abradable layer 25 on the raised portions 31 is made thinner than the film thickness T1 at the other portions.

The seal member 9 consists of a plurality of, for example six, divided seal members 27 which have been divided in the circumferential direction C. This number of divisions is suitably determined by considering various conditions, such as the size of the seal member 9, the production facilities, and the structure of the rotary machine etc.

Figure 2:
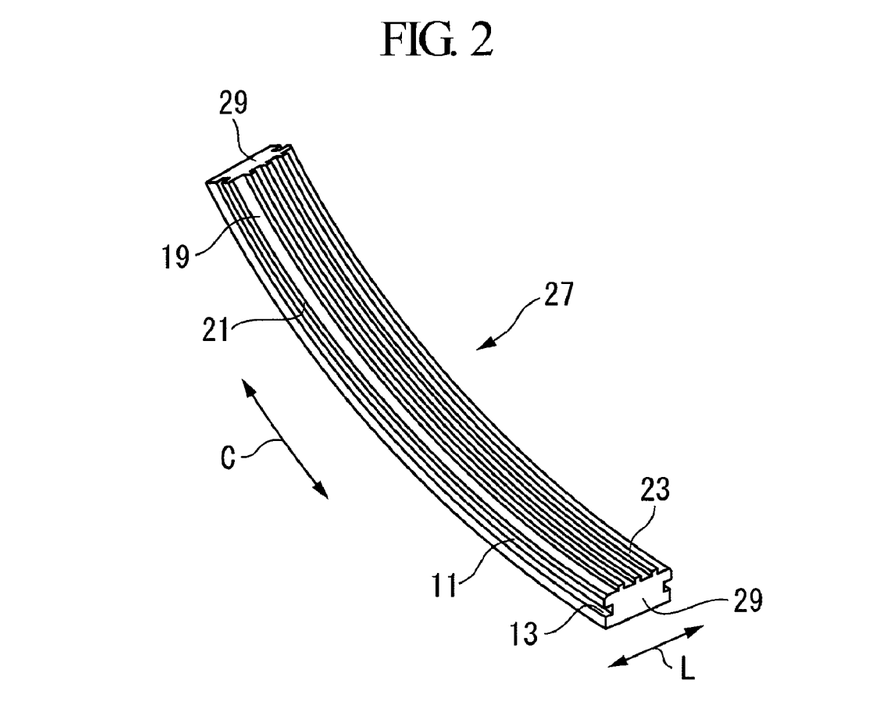
FIG. 2 is a perspective view showing a divided seal member of one embodiment of the present invention.

FIG. 2 is a perspective view showing the divided seal member 27. At the end portions of the divided seal member 27 in the circumferential direction C, circumferential end surfaces 29 are provided so as to extend in the radial direction K.

The seal member 9 may be formed as a single piece instead of assembling the divided seal members 27.

The production of the seal member 9 in the seal structure 1, constructed as described above, will be explained.

First of all, the main body of the divided seal member 27 is processed into the shape as shown in FIG. 2 by, for example, machining.

This processing is done in the following way, for example.

A long plate is cut into a predetermined length and width. Next, the sealing surface 19 is milled so as to leave the ridged portions 23, and the engaging grooves 13 and the tapered portions 21 are machined at the end surfaces 11. Subsequently, bending processing is conducted such that an arc having a predetermined radius of curvature is formed.

Next, the abradable layer 25 is formed on the sealing surface 19.

Figure 5:
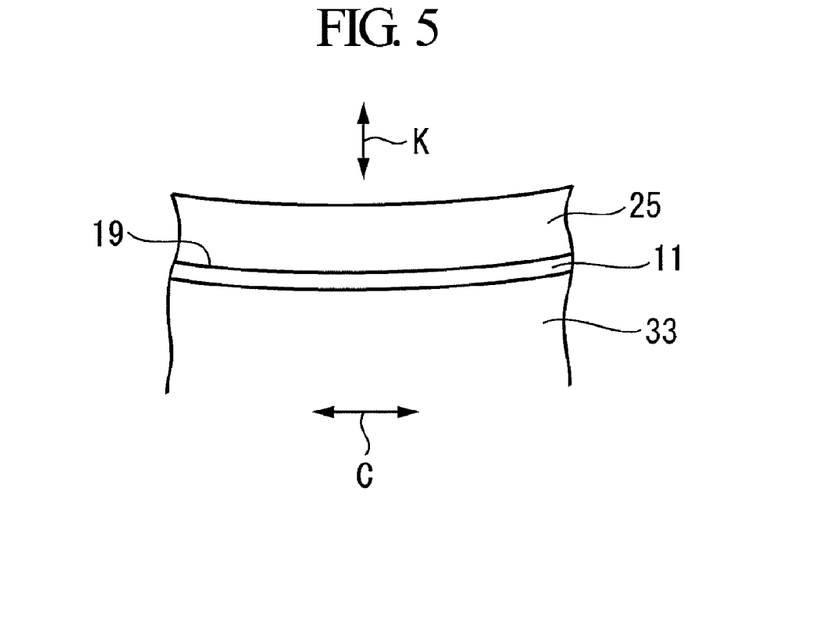
FIG. 5 is a partial front view showing masking according to an embodiment of the present invention.

First, as shown in FIG. 5, the masking 33 is applied to the end surfaces 11 such that the thermal spraying film will not be formed there, and blasting is conducted for preparing the surface prior to the thermal spraying.

At this time, the end portion of the masking 33 at the sealing surface 19 side is positioned to have a gap with respect to the sealing surface 19. This gap is normally, for example, 2 to 3 mm.

In this state, for example, Atmospheric Plasma Spraying (APS: Atmospheric Plasma Spraying) is used to spray the abradable material onto the sealing surface 19.

As the abradable material, one containing a metallic component including cobalt, nickel, chromium, aluminum, and yttrium (hereinafter referred to Co Ni Cr Al Y) as main components, and one containing boron nitride (h-BN) as solid lubricant and polyester (resin material) for porosity control is used.

This is merely an example of the abradable material, and any suitable materials can be used.

The thermal spraying was conducted with sufficient time to reduce the degree of fusion as much as possible and was conducted by setting a suitable current and voltage so as to be able to maintain the adhesion.

Accordingly, the residual stress in the abradable layer 25 can be reduced.

While conducting this thermal spraying, the molten abradable material is rapidly cooled, solidifies, and shrinks as soon as it attaches to the sealing surface 19. Therefore, residual stress is caused within the formed abradable layer 25.

In this embodiment, since the abradable layer 25 is formed, on the sealing surface 19, discontinuously along the axial direction L by the tapered portions 21 and ridged portions 23, the directions in which the residual stress acts differ from each other, and so the effect thereof can be segmented.

In this way, since the effect of the residual stress in the axial direction L can be segmented, large residual stress will not be concentrated at specific locations. In other words, the residual stress that may cause interfacial separation can be reduced.

Therefore, since the occurrence of the interfacial separation can be inhibited, the film thickness of the abradable layer 25 can be increased.

The abradable layer 25 having different thicknesses was formed on the divided seal member 27 having the tapered portions 21 as shown in FIG. 3, the divided seal member 27 having the raised portions 31 as shown in FIG. 4, and the flat-shaped divided seal member 27 without these, and the presence and absence of interfacial separation was inspected visually. This situation is shown in Table 1.

TABLE 1

| End Shape | Film Thickness (nm) | Presence and Absence of Boundary Separation After Thermal Treatment |
|---|---|---|
| Flat | 1.0 | o |
|  | 3.0 | x |
| Tapered (FIG. 3) | 1.0 | o |
|  | 3.0 | o |
|  | 3.5 | o |
| Raised (FIG. 4) | 1.0 | o |
|  | 3.0 | o |

* o: no interfacial separation, x: interfacial separation occurred

Referring to Table 1, in the case of the divided seal member 27 having the tapered portions 21 as shown in FIG. 3 or the raised portions 31 as shown in FIG. 4, interfacial separation did not occur even when the film thickness exceeded 3 mm; however, in the case of the flat divided seal member 27, interfacial separation occurred when the film thickness exceeded 3 mm.

Furthermore, particularly at the end portions where the residual stress tends to concentrate, the influence of the central portion in the axial direction can be separated by the tapered portions 21, and therefore, interfacial separation can be effectively inhibited.

Furthermore, at the tapered portions 21, since the film thickness of the abradable layer 25 is lower than the other portions, the residual stress generated can be further reduced. Accordingly, the film thickness of the abradable layer 25 on the portions that achieve the sealing action can be made even larger.

The ridged portions 23 need not be formed if, for example, the length along the axial direction L of the central portion in the axial direction L is short, or if the film thickness required is low.

In this way, if the film thickness T1 of the abradable layer 25 can be made large, for example, the clearance between the fins 5 and the abradable layer 25 in the rated rotational speed range can be set small, and therefore, the sealing performance of the seal structure 1 can be improved.

Accordingly, for example, improved reliability and improved performance of the rotary machine can be achieved.

Furthermore, since a gap exists between the end portion of the masking 33 at the sealing surface 19 side and the sealing surface 19, the masking 33 will not be engaged with the interface between the sealing surface 19 and the abradable layer 25. Therefore, the occurrence of micro-cracks due to the masking 33 at this interface can be prevented.

If these micro-cracks do not exist, there will be nothing that acts as a source of separation, and therefore, the occurrence of separation can be further inhibited. Accordingly, the film thickness T1 of the abradable layer 25 can be made even larger.

After the completion of the formation of the abradable layer 25 of prescribed film thickness T1 by the thermal spraying, after-treatment is conducted.

Figure 6:
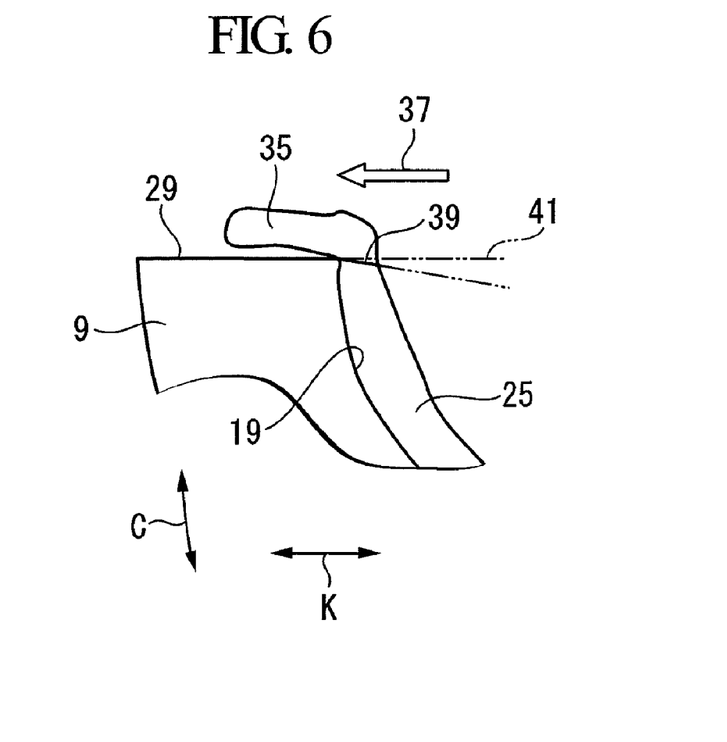
FIG. 6 is a partial side view showing an excess convexity formed in the end portion in the circumferential direction according to an embodiment of the present invention.

At the end portions of the divided seal member 27 in the circumferential direction C, in order to maintain the desirable film thickness T1 of the abradable layer 25 up to the edges, as shown in FIG. 6, the film is banked beyond the circumferential end surface 29.

This excess convexity 35 is cut away in the processing direction 37 from the abradable layer 25 side to the sealing surface 19 side by machining, for example, grinding, turning, etc. At this time, a processed surface 39 is slightly more inclined toward the inside than an extension surface 41 of the circumferential end surface 29. This inclination is made to the extent that, for example, the position of the surface end portion of the processed surface 39 is 0.05 mm or less away from the extension surface 41.

In this way, when the excess convexity 35 is cut away, a force is applied only in the processing direction 37, and therefore, during this machining, a force is not applied to the abradable layer 25 in the direction away from the sealing surface 19.

In this way, a force is not applied in the direction that separates the abradable layer 25 during the machining, and therefore, separation (fracture) of the abradable layer 25 due to the machining can be inhibited. Accordingly, the abradable layer 25 can be made thick without being limited by the machining.

The thus-formed abradable layer 25 is subjected to thermal treatment at 500 to 650° C., thereby removing polyester contained in the abradable layer 25 due to this heat.

Since the abradable layer 25 becomes a porous structure by this treatment, the amount of heat generated by sliding when contacted with the fins 5 can be reduced.

By adjusting the content of polyester, the porosity of the abradable layer 25 can be adjusted.

Figure 7:
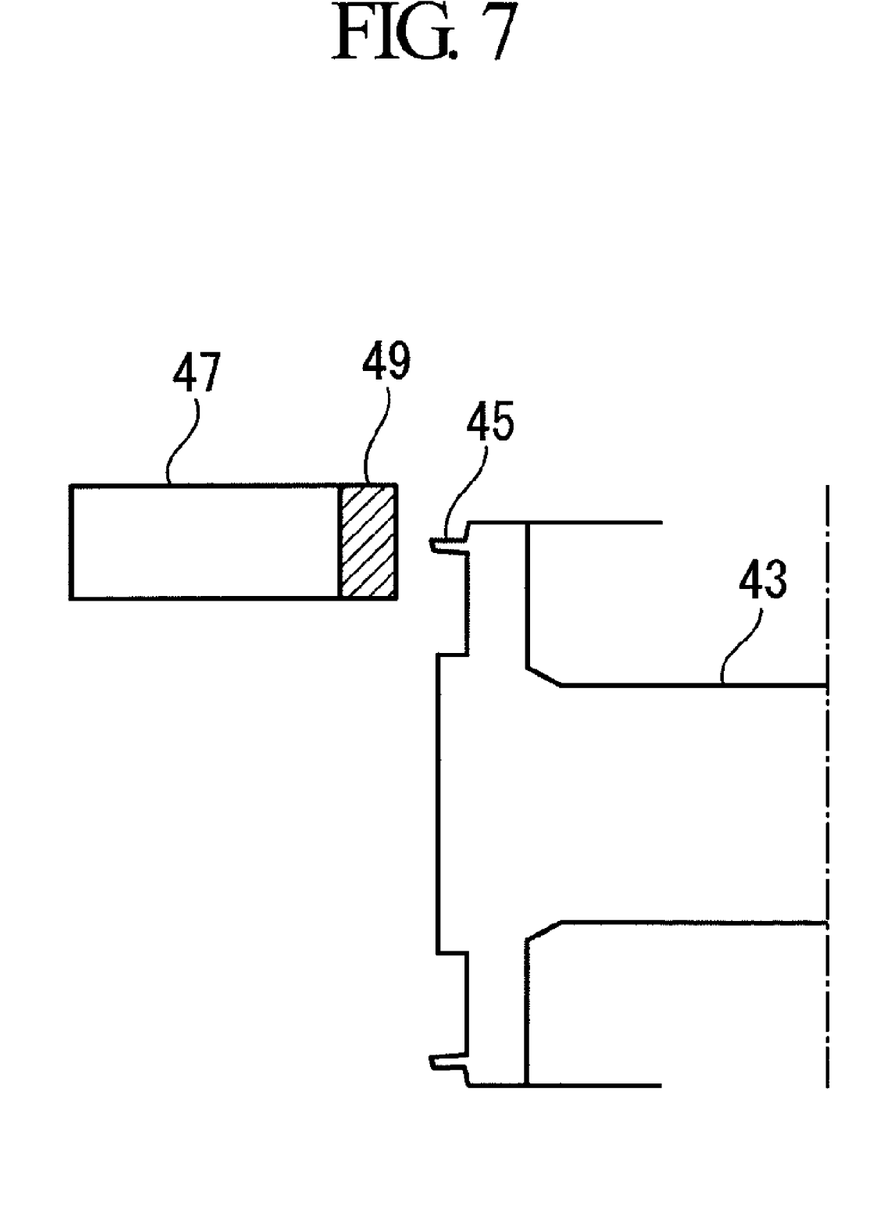
FIG. 7 is a schematic partial front view showing a sliding test device of an abradable layer according to an embodiment of the present invention.

As shown in FIG. 7, a fin 45 was mounted at the tip end of a rotating rotor 43, and a sliding test was conducted by contacting a test piece 47 having an abradable film 49 applied at the tip to the fin 45 at a constant feeding speed. The test conditions were: test temperature, 550° C.; circumferential speed of the rotor 43, 70 m/s; feeding speed of the test piece 47, 10 µm/s; feeding amount, 0.5 mm.

Furthermore, as the test pieces, the abradable films 49 having porosities of 0%, about 15%, and about 40% were used. As a reference for the amount of heat generated, a test piece of 12 Cr steel was used.

Temperature, drag force, and cutting force at the vicinity of the tip end of the test piece during sliding were obtained by a three-component force sensor, and the amount of heat generated was calculated from the average cutting force during sliding.

The results thereof are shown in Table 2.

TABLE 2

| Material | Thermal Treatment Condition | Porosity | Amount of Heat Generated |
|---|---|---|---|
| Conventional Fin (12 Cr steel) | — | None | 1 (set as a reference) |
| Abradable Material (Co, Ni, Cr, Al, Y + BN + polyester) | Without Thermal Treatment | 0% (Resin material remaining) | 1.5 |
| | 650° C. | About 15% | 0.6 |
| | 650° C. | About 40% | 0.3 |

Referring to Table 2, it can be seen that the amount of heat generated by sliding can be reduced with an increase in the porosity.

When the polyester portion is removed, the contact surface area between the abradable layer 25 and the sealing surface 19 is reduced to reduce the adhesive force between the two, and it is possible that separation may be caused; therefore, the content of the polyester must be in a range within which such a situation will not occur.

In order to compensate for the lowering of the adhesive force, an undercoat for improving adhesion between the abradable layer 25 and the sealing surface 19 may be applied on the sealing surface 19.

The present invention is not limited to the embodiments described above; suitable modifications are possible without departing from the spirit of the invention.

The invention claimed is:

1. A seal structure comprising:
a plurality of fins that project in a ring-shape from a circumferential surface of a rotating member;
a seal member having a ring-shaped sealing surface opposed to the fins; and
an abradable film formed on the seal member by thermally spraying abradable material onto the sealing surface;
wherein the seal member includes an inclined portion at an end portion of the sealing surface in an axial direction of the seal member, the inclined portion being inclined in a radial direction of the seal member,
wherein a film thickness of the abradable film on the inclined portion is thinner than a film thickness at other portions of the seal member,
wherein the seal member includes recesses and ridged portions extending in a circumferential direction of the seal member and spaced apart in the axial direction of the seal member,
wherein the fins engage the recesses and the ridges, and
wherein each ridged portion has a sealing surface and a tapered portion disposed on each side of the sealing surface in the axial direction of the seal member, each tapered portion is inclined in the radial direction of the seal member, and a film thickness of the abradable film on the tapered portions is thinner than a film thickness on the sealing surface.

2. The seal structure according to claim 1, wherein the abradable film is formed discontinuously such that residual stress in different portions of the abradable film acts in different directions.

3. The seal structure according to claim 1, wherein the abradable film is configured such that residual stress in different portions of the abradable film acts in different directions.

4. The seal structure according to claim 1, wherein the abradable material includes a metallic component, a solid lubricant, and polyester.

5. The seal structure according to claim 4, wherein the metallic component is selected from the group consisting of cobalt, nickel, chromium, aluminum, and yttrium.

6. The seal structure according to claim 5, wherein the solid lubricant is boron nitride.

7. The seal structure according to claim 1, wherein the inclined portion is inclined with respect to the radial direction and the axial direction of the seal member, and
wherein the tapered portions are inclined with respect to the radial direction and the axial direction of the seal member.

* * * * *